US008281398B2

(12) United States Patent
Ness et al.

(10) Patent No.: US 8,281,398 B2
(45) Date of Patent: Oct. 2, 2012

(54) REORDERING DOCUMENT CONTENT TO AVOID EXPLOITS

(75) Inventors: Jonathan Daniel Mark Ness, Bothell, WA (US); Bruce Dang, Tacoma, WA (US); Robert John Hensing, York, SC (US); Morgan Daniel Beenfeldt, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 12/349,506

(22) Filed: Jan. 6, 2009

(65) Prior Publication Data

US 2010/0175133 A1 Jul. 8, 2010

(51) Int. Cl.
G06F 12/14 (2006.01)
G06F 11/30 (2006.01)
G06F 9/45 (2006.01)
G06F 21/00 (2006.01)
G06F 21/22 (2006.01)
G06N 3/12 (2006.01)
G06F 11/00 (2006.01)

(52) U.S. Cl. ............. 726/23; 726/24; 713/194; 717/136
(58) Field of Classification Search .................... 726/23, 726/24; 713/201; 717/136
See application file for complete search history.

(56) References Cited

U.S. PATENT DOCUMENTS

| 7,373,519 | B1 | 5/2008 | Nachenberg et al. |
| 7,376,702 | B2 | 5/2008 | DeSalvo et al. |
| 7,730,542 | B2* | 6/2010 | Cronce et al. ............ 717/136 |
| 2003/0154399 | A1* | 8/2003 | Zuk et al. ............ 713/201 |
| 2006/0129603 | A1 | 6/2006 | Park et al. |
| 2006/0272021 | A1* | 11/2006 | Marinescu et al. ........... 726/24 |
| 2007/0136427 | A1 | 6/2007 | Zellner et al. |
| 2008/0134333 | A1 | 6/2008 | Shipp |
| 2008/0209551 | A1 | 8/2008 | Treacy et al. |
| 2009/0282484 | A1 | 11/2009 | Wiseman et al. |

FOREIGN PATENT DOCUMENTS

WO    WO 2008017950 A2 *  2/2008

OTHER PUBLICATIONS

Laurence Holt; "A year affair with security: the development of a security program and manager"; Sep. 2006; InfoSecCD '06: Proceedings of the 3rd annual conference on Information security curriculum development, ACM; pp. 130-135.*
Li, et al., "Sparse: A Hybrid System to Detect Malcode-Bearing Documents", retrieved at <<http://www1.cs.columbia.edu/ids/publications/cucs-006-08.pdf, pp. 1-20.
LeBlanc, David, "David LeBlanc's Web Log", retrieved at <<http://blogs.msdn.com/david_leblanc/archive/2007/05/08/new-file-converter-coming-soon.aspx>>, May 8, 2007, pp. 4.
"Description of the Microsoft Office Isolated Conversion Environment Update for the Compatibility Pack for Word, Excel, and PowerPoint 2007 File Formats", retrieved at <<http://support.microsoft.com/kb/935865>>, Oct. 7, 2008, pp. 5.

* cited by examiner

*Primary Examiner* — Eleni Shiferaw
*Assistant Examiner* — Courtney Fields

(57) ABSTRACT

Structured document files, such as those utilized by standard productivity applications or for portable documents can have malicious computer executable instructions embedded within them. Modifications to such files can prevent the execution of such malware. Modifications can operate at a file sector level, such as either fragmenting or defragmenting the file, or they can operate at a file record level, such as removing records, adding records, or rearranging the order of records. Other modifications include writing random data into records deemed likely to have malware, removing unaccounted for space, or removing records that are not known to be good and are inordinately large. A scan of the structured document file can identify relevant information and inform the selection of the modifications to be applied.

19 Claims, 10 Drawing Sheets

REORDERING DOCUMENT CONTENT TO AVOID EXPLOITS

BACKGROUND

Malicious computer executable instructions, commonly referred to as "malware", can take many forms, including, for example, viruses, Trojan horses, and software exploits. At bottom, however, all share one basic characteristic: to cause the execution of the malicious computer executable instructions on a computing device. Some malware is capable of causing a target computing device to execute its instructions by exploiting the ignorance or unpreparedness of the users of that computing device. Thus, for example, a malicious executable file can be presented as an image or other benign file to entice a user of a computing device to open such a file and, consequently, cause the execution of the malicious computer executable instructions present in the file. Other malware is capable of causing a target computing device to execute its instructions by exploiting aspects of the design of the computing device or other executable instructions executing on the computing device. For example, early forms of malware were able to commandeer specific interrupts in early operating systems, and thereby copy themselves or cause execution of their malicious instructions.

Often, the malicious computer executable instructions that comprise a piece of malware were embedded or attached to other, benign files. Traditionally such files were executable files having their own, benign, computer executable instructions. When such files were "infected" with the malware, the execution of the benign computer executable instructions of the file would also result in the execution of malicious computer executable instructions. More recently, however, malware has taken the form of non-executable files that, traditionally, would not have had computer executable instructions within them. For example, structured document files can, themselves, be malware because such files can be created such that, when they are parsed by an appropriate program in order to be displayed and edited, the design of the parser can be exploited to cause the execution of malicious computer executable instructions embedded within the document file.

Efforts to prevent the execution of malicious computer executable instructions have traditionally focused on detecting the malware and preventing the execution of what were deemed to be "suspicious" instructions. Malware detection has traditionally focused on finding unique combinations of data that are only present in the malware. Such unique combinations, known as malware "signatures", can enable malware detecting mechanisms to identify malware from among other, legitimate, non-malicious computer executable instructions. However, in order to detect malware by searching for its signatures, those signatures must first be identified and distributed. Such identification and distribution of signatures requires time, thereby providing a window of time during which the malware can execute on a computing device without detection. To prevent malware from executing without waiting for such signatures to be identified and distributed, behavior blockers were developed that monitored the execution of computer executable instructions and stopped any instructions that appeared to be suspicious. Unfortunately, the behavior of malware was often similar to the behavior of legitimate software applications, such as installation applications or operating system utilities. Consequently, behavior blockers would often alert the user to suspicious activity when the user was performing legitimate actions. As a result, behavior blockers were often not trusted by the users of computing devices.

SUMMARY

To prevent the execution of malicious computer executable instructions embedded in, or otherwise associated with, structured document files, the structured document files can be modified prior to access. Such modifications can maintain the structured document file in an appropriate format to enable it to be properly opened and parsed by an appropriate application program traditionally used to open or edit such structured document files. Simultaneously, however, the modifications to the structured document file can handicap any embedded malicious computer executable instructions, or otherwise prevent the structured document file from causing or performing a malicious action.

In one embodiment, structured document files can be intercepted as they are delivered to a computing device, such as through email, network downloads, or from removable storage media. The intercepted structured document files can be examined to identify relevant aspects of the files, such as their overall structure and whether or not they possess specific characteristics. The information obtained from the examination of the structured document files can be utilized to select some or all of the modifications that can be applied to the structured document files.

In another embodiment, a structured document file can be modified by either defragmenting the file's sectors if the file is fragmented, or fragmenting the file's sectors if the file is not fragmented or not sufficiently fragmented. The file's sectors, as used for such operations, can be the basic units of the structured document file's storage mechanism and can be different from the physical storage media sectors on which the file is stored.

In yet another embodiment, a structured document file can be modified by creating a new file that comprises all of the accounted for information from the old structured document file, but does not include any unaccounted for information. Alternatively, a structured document file can be modified by creating a new file that comprises all of the records from the old structured document file that are known to be good, or are otherwise not large enough to comprise malicious computer executable instructions. By not writing unaccounted for information into a new file, or large unknown records into the new file, likely malicious computer executable instructions can be left out of the new file.

In a further embodiment, a structured document file can be modified by adding random data, such as in the form of a new record, to the structured document file. Alternatively, random data can be added to specific areas of a structured document file that are deemed to comprise malicious computer executable instructions. The addition of data to the structured document file can prevent malicious computer executable instructions from identifying a proper location within the file, since the file's size will be changed, while the addition of random data to specific areas of the structured document file that are thought to comprise malicious computer executable instruction can render such instructions inoperable.

In a yet further embodiment, a structured document file can be modified by randomly rearranging records or other collections of information. Links and pointers between the records can be maintained, enabling proper parsing of the structured document file, but malicious computer executable instructions, which often rely on fixed locations within a file, may cease to be operational.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
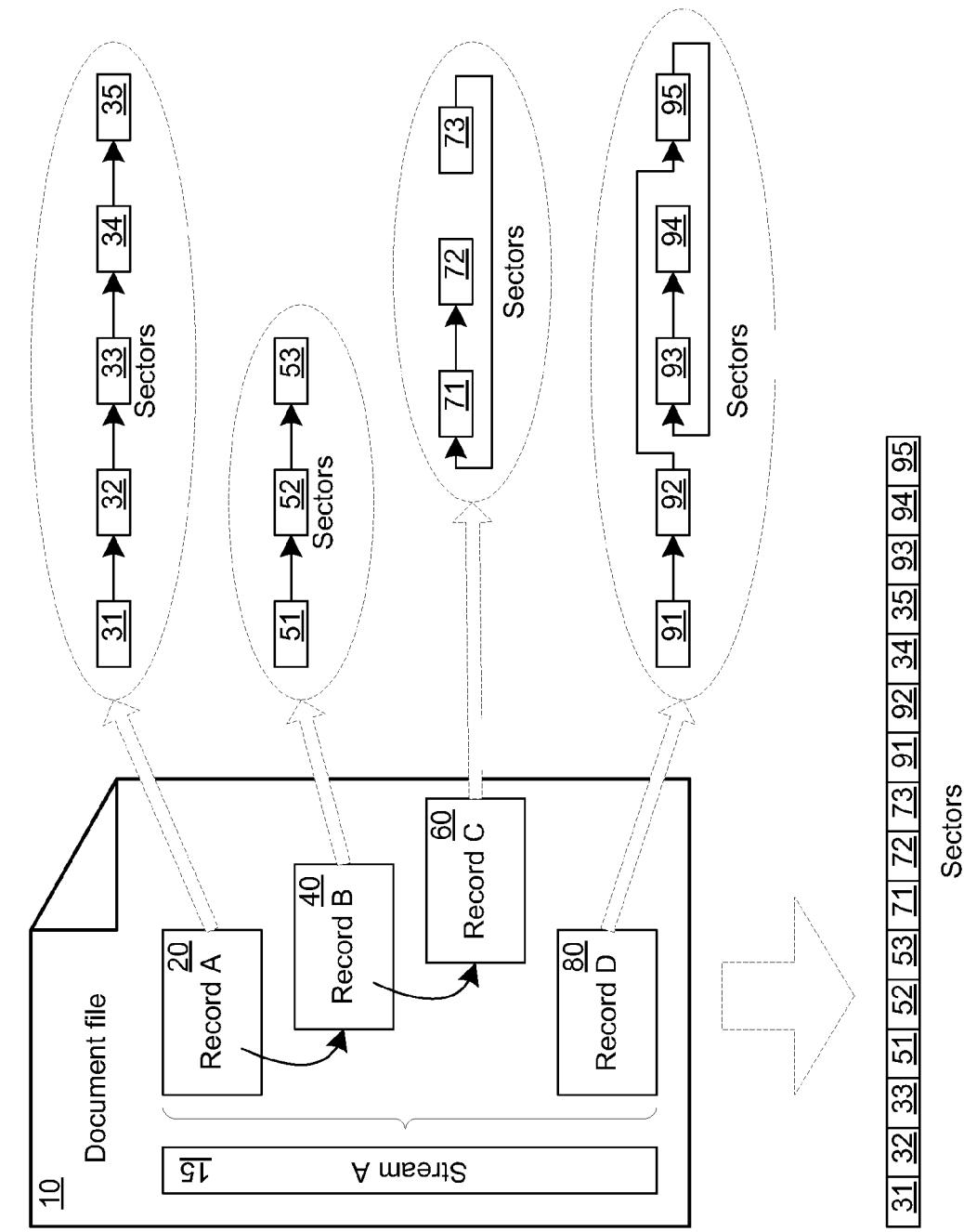
FIG. 1 is a block diagram of an exemplary structured document file.

The following description relates to the modification of structured document files to protect against malicious computer executable instructions that can be embedded within the structured document files, or otherwise associated with them. Modifications to the structured document files can be performed at a file sector level, such as either fragmenting or defragmenting the file, or they can be performed at a file record level, such as randomly rearranging a file's records, adding data to a file, or portions of a file, and ignoring portions of a file when creating a new copy of the file. The modifications can be informed by, and even invoked by, an examination process that can obtain information about the structured document files and can identify potentially useful modifications.

As used herein, the term "structured document file" is meant to refer to any file that represents a document and that stores the data of such a document in a structured format, such that the document is displayed to a user by an application program that can read the structured document file, parse through the structure of the file, and display the data of the file accordingly. Typically, structured document files include word processing documents, spreadsheets, presentations or other such document files created by traditional business productivity applications, including applications directed to the creation of so-called "portable documents" that can be equivalently displayed and edited on multiple computing devices, irrespective of the configuration of such computing devices.

The structured document file can retain information in records that can be linked together. As used herein, the term "record" is meant to refer to information that is treated as a single cohesive unit. Thus, for example, the text on a slide of a presentation can be a single record in a structured document file, as can be the formatting options applied to that text. However, as will be understood by those skilled in the art, differing structured document files may utilize differing types of records, though all such records are meant to be included by utilization of the term "record" in the descriptions below.

In some cases, structured document files can rely on underlying linked storage technologies to provide the basic storage of the data of the structured document files. As used herein, the term "sector" is meant to refer to a quanta of structured document file information as defined by an underlying structured document file storage mechanism. Such "sectors" are different from, and may have no established relationship with, the physical sectors of the physical storage media on which such information is stored. Instead, as used herein, the term "sector" applies to a logical division of data, such that individual sectors can be linked together and, thereby, through such collections of sectors, provide for the storage of the information of individual records and of the overall structured document file itself.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 99 is illustrated showing the components and parts of a structured document file 10. In particular, the structured document file 10 is shown comprising records 20, 40, 60 and 80. As indicated previously, each of the records 20, 40, 60 and 80 can represent a collection of information that can be treated as a single cohesive unit. As will be known by those skilled in the art, structured document files, such as the structured document file 10, can traditionally comprise hundreds of records, such as records 20, 40, 60 and 80. For ease of illustration, however, the structured document file 10 of FIG. 1 is shown with only four such records, namely Record A 20, Record B 40, Record C 60 and Record D 80.

At least some of the records 20, 40, 60 and 80 can be linked or otherwise associated with one another. In the illustrated exemplary structured document file 10 of FIG. 1, Record C 60 is illustrated as being associated with Record B 40 and Record B is, in turn, shown as being associated with Record A 20. Such associations or linkages can take a variety of forms. For example, Record A 20 can represent a slide in a presentation, where the overall presentation is stored in the structured document file 10. In such a case, Record B 40 could represent a text block within the slide represented by Record A 20 and, as such, Record B would be linked to, or otherwise referenced by, Record A. Similarly, Record C 60 could represent a formatting specification of the text of Record B 40. Consequently, Record C 60 could, likewise, be linked to, or otherwise referenced by, Record B 40.

In the illustrated embodiment, each of the records 20, 40, 60 and 80 can be contained within a single stream, such as the Stream A 15. A "stream", such as Stream A 15, can be a unified collection of data as seen by a storage architecture that underlies the storage of the data of the structured document file 10. The structured document file 10 can comprise other streams, such as streams for other file formats or other collections of data within the structured document file, though, for simplicity of illustration, such other streams are not shown in the system 99. In some embodiments, at least some records, such as the records 20, 40, 60 and 80, can also be contained within those other streams though, again, for simplicity of illustration, they are shown in system 99 as all being part of the single Stream A 15. Typically, linked records, such as records 20, 40 and 60, could be stored within a single stream, thereby avoiding spanning streams with their references to one another.

Each of the records 20, 40, 60 and 80 can be comprised of one or more sectors, such as sectors 31, 32, 33, 34, 35, 51, 52, 53, 71, 72, 73, 91, 92, 93, 94 and 95. As indicated previously, a sector, such as any of the sectors 31, 32, 33, 34, 35, 51, 52, 53, 71, 72, 73, 91, 92, 93, 94, or 95, can be a quanta of information of the structured document file 10 as defined by an underlying storage mechanism utilized to store the information of the structured document file 10. Thus, as shown, the information of the structured document file 10 is stored in the sectors 31, 32, 33, 34, 35, 51, 52, 53, 71, 72, 73, 91, 92, 93, 94 and 95.

As also shown, each of the sectors 31, 32, 33, 34, 35, 51, 52, 53, 71, 72, 73, 91, 92, 93, 94 and 95 can comprise a pointer to the next sector within a particular record. Thus, for example, sector 31 can comprise a pointer to sector 32, sector 32 can comprise a pointer to sector 33, and so forth. So long as each sector comprises a pointer to the next sector, even if the pointed-to sector is not the next subsequent sector as the sectors are stored within the structured document file 10, the data of the structured document file can be collected and parsed properly. Thus, for example, even though sectors 92 and 93 are shown as adjacent to one another, sector 92 may specify sector 95 as the next subsequent sector from which information should be obtained.

Additionally, as shown below the structured document file 10 in FIG. 1, the order in which the sectors are stored may likewise be fragmented, such that sectors of individual records are split up and interleaved among the sectors of other records. Such can especially be true if the structured document file 10 was opened and edited multiple times, as each edit may have appended data to the end of the collection of sectors that comprise the structured document file without regard to the specific record to which such sectors belong. For example, as shown in FIG. 1, the sectors 34 and 35 and the sectors 93, 94 and 95 can be stored at the end of the collection of sectors, as stored, shown below the structured document file 10, irrespective of the location of the other sectors of those same records, namely sectors 31, 32 and 33 and sectors 91 and 92.

Figure 2:
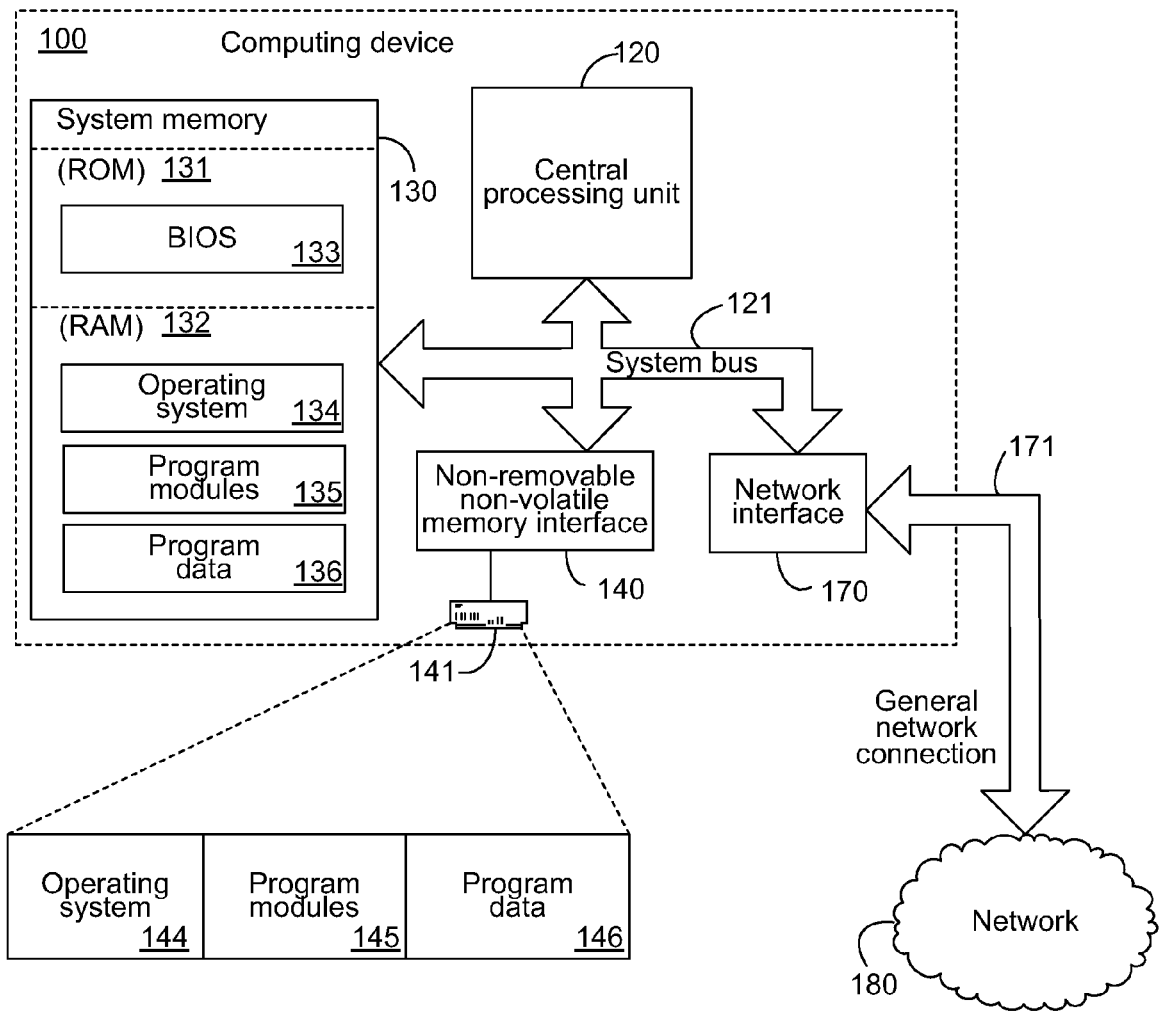
FIG. 2 is a block diagram of an exemplary computing device.

Before proceeding with further detailed descriptions regarding the modifications that can be applied to the structured document file 10, the framework for the below descriptions is provided with reference to FIG. 2, wherein an exemplary computing device 100, such as a computing device upon which such modifications can be performed, is further illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Structured document files, such as the structured document file 10 of FIG. 1, can be delivered to the computing device 100 via the general network connection 171, such as through email or by being downloaded from the network 180, or they can be provided via removable storage devices that can be connected, either directly or indirectly, to the system bus 121. Structured document files can, likewise, already be resident on storage devices communicationally coupled to the CPU 120, such as, for example, the hard disk drive 141. As will be indicated below, an initial examination operation can be performed, either when structured document files are first delivered to the computing device 100, such as through the mechanisms described above, or when such an examination operation is specifically invoked, either automatically, upon accessing an already present structured document file, or by a user at a time of the user's choice.

Figure 3:
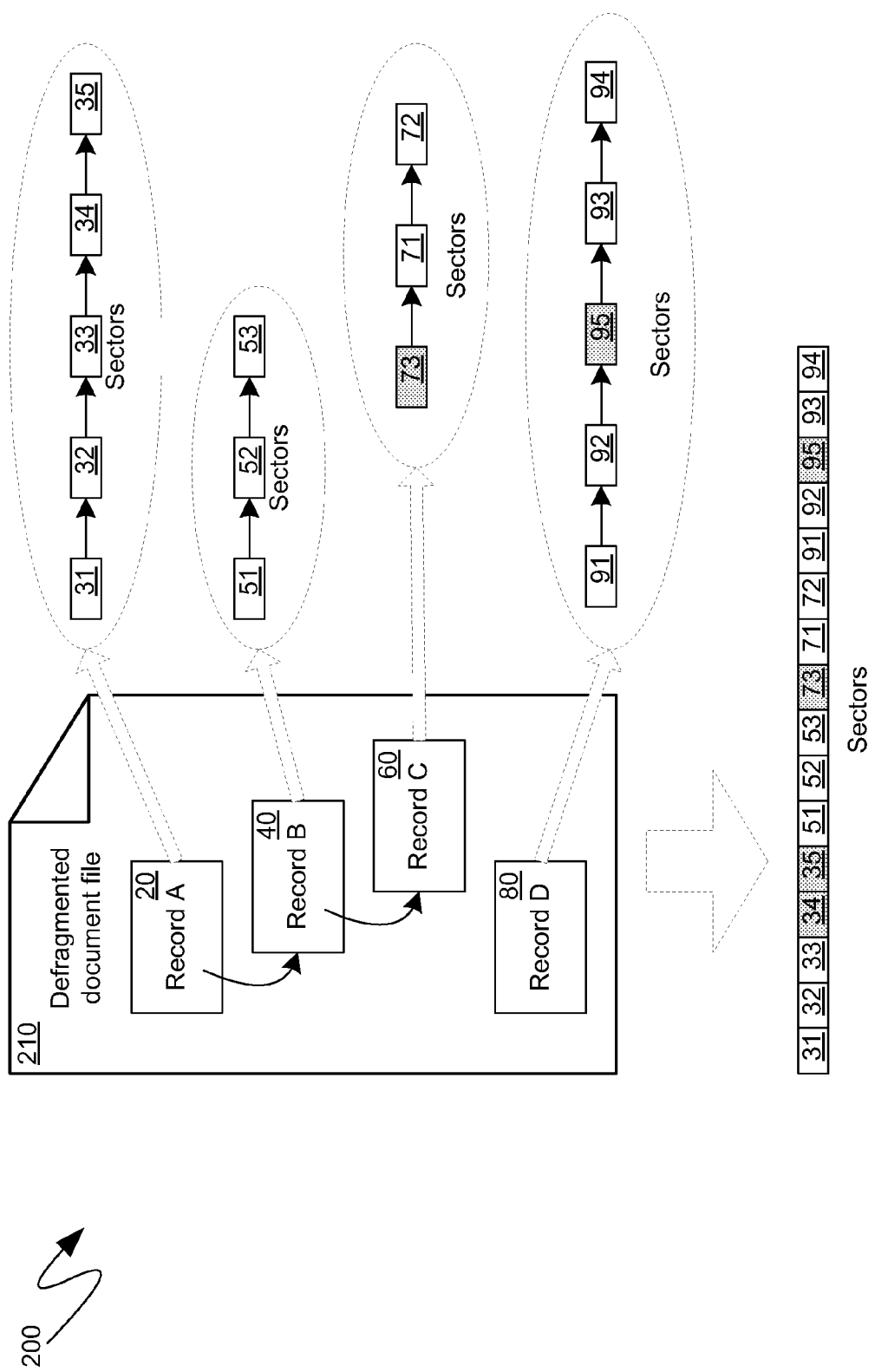
FIG. 3 is a block diagram of one exemplary modified structured document file.

The initial examination operation can detect information about the structure document file 10 that can be utilized to inform which one or more modifications, described in detail below, can be applied to the structured document file to protect the computing device 100 against any malware that may be present within the structured document file 10. For example, an initial examination or other analysis of the structured document file 10 can reveal that the file is fragmented, in that its underlying sectors are not contiguously maintained. Such information can be utilized to inform a defragmentation modification, as illustrated in the system 200 of FIG. 3. Turning to FIG. 3, as indicated by the shaded sectors, specific ones of the sectors 31, 32, 33, 34, 35, 51, 52, 53, 71, 72, 73, 91, 92, 93, 94 and 95 shown in FIG. 1 can be rearranged to yield a defragmented document file 210, as shown in FIG. 3.

For example, the sectors 71, 72 and 73 of Record C 60 can be rearranged such that sector 73 is moved prior to sectors 71 and 72. With such a move, each sector can then point to the next logical sector and such a next logical sector can also be the next sector as the sectors are stored within the defragmented document file 210. Similarly, sector 95 of Record D 80 can be rearranged such that it is located between sectors 92 and 93. Such a move can also result in each sector's next logical sector also being located adjacent to that sector as they are stored within the defragmented document file 210.

In addition to rearranging sectors within records, the sectors, as stored within the boundaries of the structured document file 10 can also be defragmented, such collections of sectors corresponding to records can be contiguous. Thus, as shown in FIG. 3, the defragmented structured document file 210 can have sectors 34 and 35 moved to be contiguous with the other sectors, namely sectors 31, 32 and 33, of the Record A 20. Sectors 73 and 95 are also shown as having been rearranged for the reasons described above.

The net result of such a defragmentation operation can be to change the order of bytes inside the structured document file 10 such that any malware instructions are out-of-order before the structured document file is parsed by software application programs that are compatible with the structured document file's format. The effect of the out-of-order malware instructions can cause the malware to fail to execute in the manner intended and, consequently, fail to be malicious. For example, malware can attempt to execute malicious computer executable instructions by jumping to a specific location within a file at which such malicious computer executable instructions are located. By defragmenting the structured document file 10, the locations of various information, including any malicious computer executable instructions, can be moved. For example, if malicious computer executable instructions were stored at sector 34, then their execution may have been caused by an instruction to execute whatever instructions were found at a certain distance from the start of the structured document file 10. Such an instruction, however, would reference sector 91 of the defragmented structured document file 210, since sector 91 is in the same absolute location, with reference to the overall file, in the defragmented structured document file 210 as sector 34 was in the structured document file 10 of FIG. 1. As a result, the malicious computer executable instructions at sector 34 would not be executed, since their location was changed by the defragmenting operation shown in FIG. 3.

Figure 4:
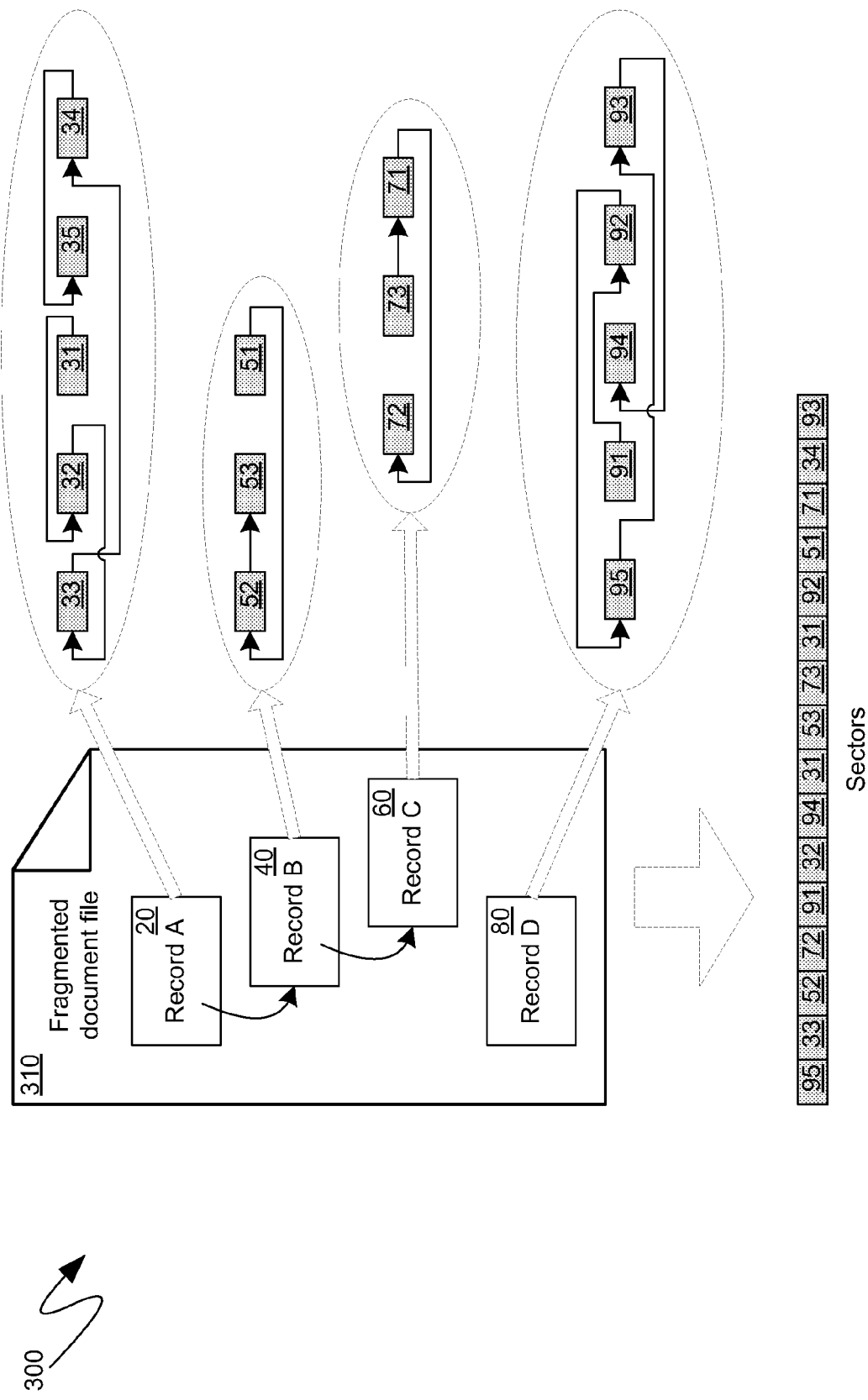
FIG. 4 is a block diagram of another exemplary modified structured document file.

If the structured document file 10 is not sufficiently fragmented, however, a defragmenting operation may not sufficiently reorder the various sectors of the file to prevent the execution of malicious computer executable instructions. In such a case, a fragmenting, as opposed to defragmenting, operation can be performed. The fragmented structured document file 310 of FIG. 4 illustrates an exemplary file produced by such a fragmenting operation. Specifically, as is indicated by the shaded sectors 31, 32, 33, 34, 35, 51, 52, 53, 71, 72, 73, 91, 92, 93, 94 and 95 of FIG. 4, in one embodiment every sector of a file, such as the structured document file 10 can be moved to a new relative location to create the fragmented structured document file 310.

As indicated previously, when moving sectors, the pointers, or links, that each sector maintains to the next logical sector can, likewise, be updated to maintain proper parsing of the fragmented structured document file 310 by software application programs that were compatible with the file's structure. Thus, for example, the sectors 31, 32, 33, 34 and 35 that contain the information of Record A 20 can be rearranged into the order: 33, 32, 31, 35, 34, as illustrated in FIG. 4. In such a case, the pointer that, for example, sector 31 maintained to sector 32 can remain intact, even though sector 32 is now stored in a relative location in front of sector 31. The pointers of the other sectors can likewise be maintained to identify the next logical sector, irrespective of the current storage location of such a sector.

The sectors 31, 32, 33, 34, 35, 51, 52, 53, 71, 72, 73, 91, 92, 93, 94 and 95 can be randomized, not only within their individual records, but also with respect to their storage within the file structure as a whole. Thus, as illustrated by the collection of sectors below the fragmented structured document file 310 in FIG. 4, the locations of the various sectors can be moved and changed throughout the entire file. As a result, malware, which, as indicated previously, traditionally attempts to execute hidden, embedded malicious executable instructions by specifying absolute locations within a file, will likely not specify the correct location of such malicious instructions within the fragmented structured document file 310. Returning to the prior example, if malicious executable instructions were stored in sector 34, those instructions could be executed by specifying the location of sector 34 within the structured document file 10, as shown in FIG. 1. That same location, relative to the overall file, would actually be sector 92 in the fragmented structured document file 310 of FIG. 4. As a result, an attempt by malware present in the structured document file 310 to execute malicious instructions stored in sector 34 would fail, since the location specified by such malware would identify sector 92, which would not contain the malicious instructions. Nevertheless, because the pointers in each sector were maintained to point to the next logical sector, the fragmented structured document file 310 of FIG. 4 could be parsed by a software application in the same manner as the original structured document file 10 of FIG. 1, and a user of such a software application would detect no difference in the content presented between the original structured document file and the fragmented structured document file.

Figure 5:
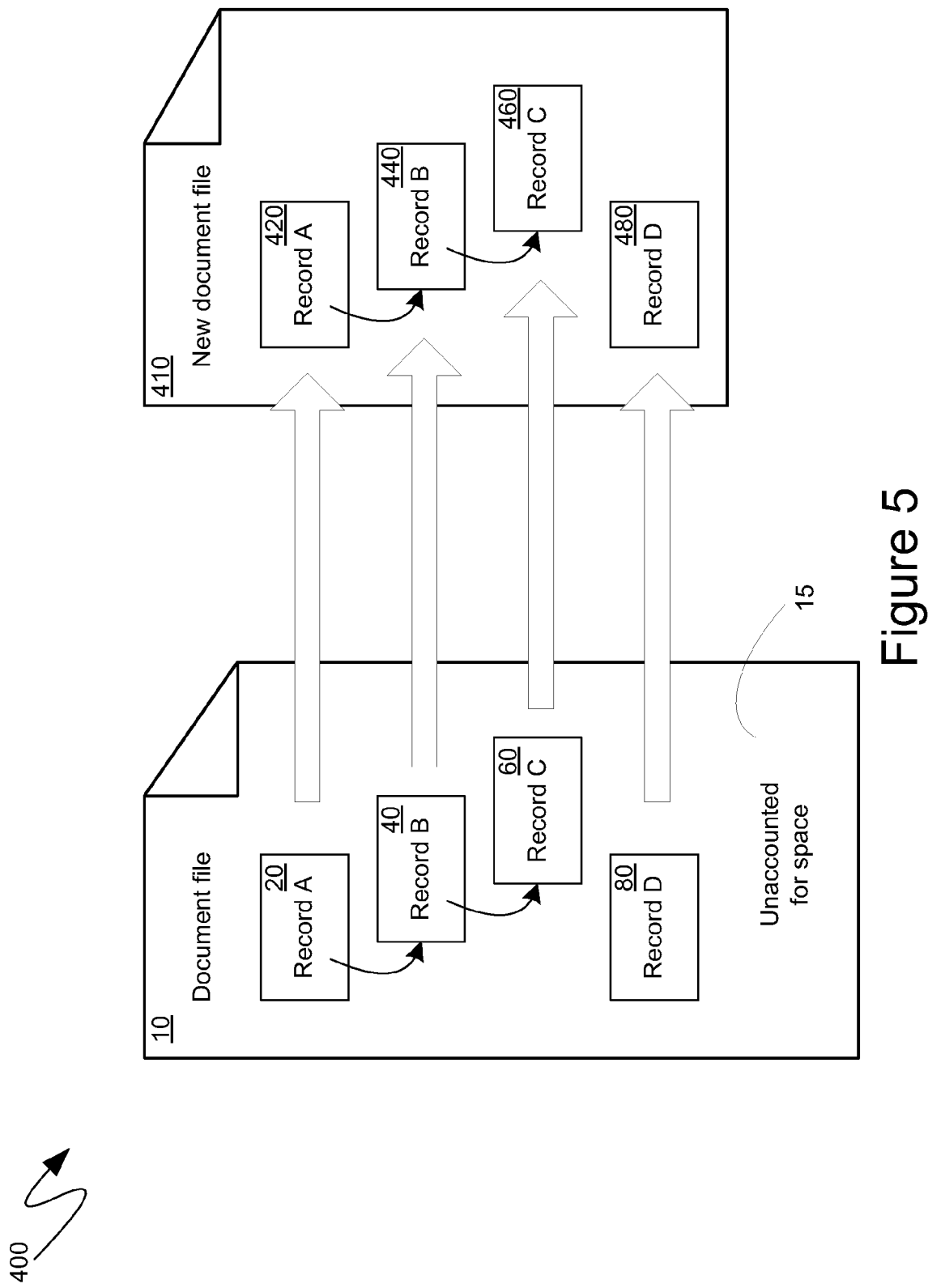
FIG. 5 is a block diagram of an exemplary modification of a structured document file.

While the above described modifications were directed to, and operated on, individual sectors of a file, such as sectors 31, 32, 33, 34, 35, 51, 52, 53, 71, 72, 73, 91, 92, 93, 94 and 95, other modifications can be directed to, and operate on, the records of a file, such as records 20, 40, 60 and 80. For example, and with reference to the system 400 of FIG. 5, a new structured document file 410, representing a modified version of the structured document file 10, can be created by writing out all of the accounted for data within the structured document file 10, but not writing out, and, thereby, leaving behind any unaccounted for space 15 in the original structured document file 10. As will be known by those skilled in the art, a structured document file, such as the structured document file 10, can be comprised of information that is appropriately linked within the file itself. Thus, for example, as indicated previously, there can exist links, or other references, between Record C 60 and Record B 40, and likewise between Record B 40 and Record A 20. Additionally, "top level" records, such as Record A 20 and Record D 80 can be referenced within a "table of contents" or similar construct that provides an overview of the content of the structured document file 10.

Malicious computer executable instructions, however, are often inserted into structured document files, such as the structured document file 10, via mechanisms that are not consistent with the file's overall structure. As such, the inserted malicious computer executable instructions appear as unaccounted for space 15, in that there exists data within the structured document file 10 that is not accessible via conventional parsing or editing of the structured document file. More specifically, an examination of the structured document file 10 can determine that, for example, the records 20, 40, 60 and 80, and any other properly referenced data comprise 620 kilobytes of data. The file system, however, can report the size of the file as 970 kilobytes of data. At least some of the 350 kilobytes of data between what the examination reveals as properly accounted for data and what the operating system indicates is the overall size of the file can be deemed to be unaccounted for space 15. The presence of such unaccounted for space 15 can be an indication that the structured document file 10 may comprise malicious instructions and, consequently, a modification can be requested that can create a new structured document file 410, with records 420, 440, 460 and 480, analogous to records 20, 40, 60 and 80, respectively from the original structured file 10, but that can leave behind the unaccounted for space 15. Any malicious computer executable instructions that may have been present within the unaccounted for space 15 can, thereby, be left out of the new structured document file 410, while the records, such as records 420, 440, 460 and 480 can remain. As a result, the new structured document file 410 can present identical content to a user when it is opened and parsed by an application program as would the original structured document file 10.

Figure 6:
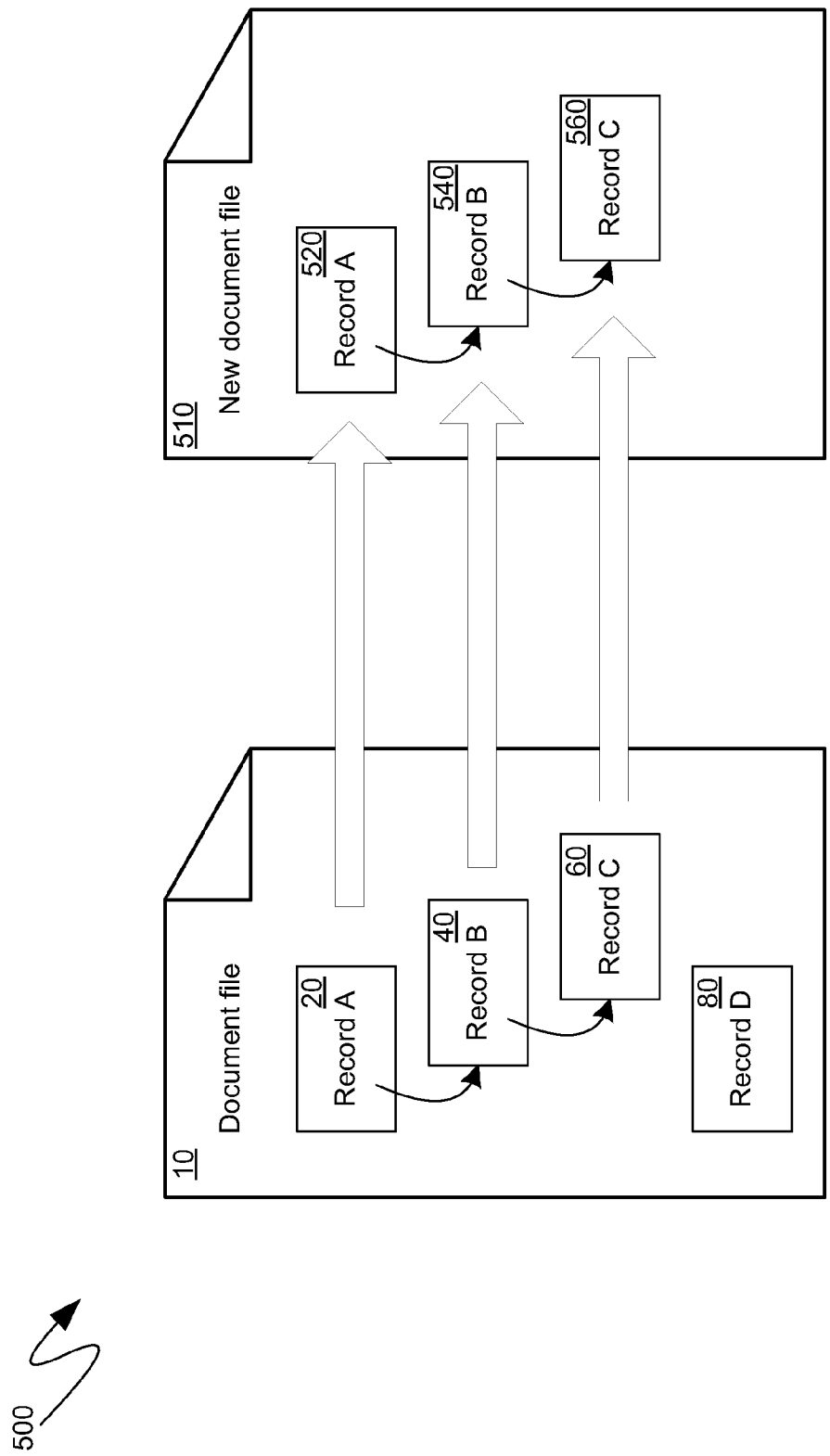
FIG. 6 is a block diagram of another exemplary modification of a structured document file.

In another embodiment, exemplarily illustrated by the system 500 of FIG. 6, rather than leaving behind unaccounted for space 15 when creating a new structured document file 410 to replace the original structured document file 10, a record, such as Record D 80 of the original structured document file 10 can be left behind and not written out to a new structured document file 510, in the manner illustrated. More specifically, while malicious computer executable instructions can be hidden in unaccounted for space 15 in a structured document file 10, they can also be contained in a record, such as the Record D 80 of the structured document file 10. In such a case, the record containing malicious computer executable instructions, such as, in the present example, Record D 80, is often noticeably larger and is often a record that is not known to be good.

Structured document files, such as the structured document file 10, can often comprise records that are not known to be good. Specifically, a comparison can be made between the type of a given record, and a list of all of the record types in a structured document file. If the listing of record types does not include the type of a particular record, such a record can be considered to be not known to be good.

Thus, in one embodiment, if an examination of the structured document file 10 reveals that one or more records that are not known to be good comprise an inordinately large amount of the size of the overall structured document file, then such one or more records can be skipped when reading records and writing them out to a new structured document file 510. In the exemplary system 500 of FIG. 6, for example, the Record D 80 can be both not known to be good and can be inordinately large. For example, the overall structured document file 10 can be 920 kilobytes while the Record D 80 can, by itself, comprise 500 kilobytes. As such, the Record D 80 can be skipped and, instead, only Record A 20, Record B 40 and Record C 60 can be written out to the new structured document file 510, as Record A 520, Record B 540 and Record C 560, respectively.

In one embodiment, the determination of whether or not a record, that is not known to be good, is inordinately large can be based on the percentage of the overall structured file's size that is attributable to the record not known to be good. Thus, in the above example, the Record D 80 can be determined to be inordinately large because it was larger than 50% of the size of the structured document file 10. The 50% limitation described, however, is strictly exemplary and other percentages, including percentages significantly higher or lower than 50% can likewise be utilized. Ultimately, the percentage selected is a quantification of a "weighing" that can be utilized to gauge whether a record, that is not already known to be good, is likely to be legitimate based on a heuristic analysis of, for example, prior structured documents that did comprise malware. Additionally, while the above example described a record that was disproportionally large, an indication of an illegitimate record can also be that it is disproportionally small.

Modifications to structured document files need not be limited to the removal of information, such as records or unaccounted for space, from a file. In other embodiments, the addition of information to a structured document file is likewise contemplated. For example, in one embodiment, described with reference to the system 600 of FIG. 7, an additional record or other collection of data can be added to a structured document file. Specifically, as shown, information from the structured document file 10 can be read and written out to a new structured document file 610. Thus, the new structured document file 610 can comprise records 620, 640, 660 and 680 that are copies of the records 20, 40, 60 and 80 of the original structured document file 10. The new structured document file 610 can also comprise an additional record, stream or other collection of information that is not present in the original structured document file 10. In the specific example of FIG. 7, a new record, Record E 685, comprising any collection of data, including even random data, can be added to the new document file 610. Likewise, though not shown in FIG. 7 strictly for illustrative simplicity, a new stream could be added to the new structured document file 610, either instead of, or in addition to, the new Record E 685.

As a result of the addition of data, such as the new Record E 685, the overall size of the new document file 610 can be larger, or at least different, from the original document file 10. As will be known by those skilled in the art, malicious computer executable instructions within a structured document file are often located by first locating a copy of the file in memory, such as the RAM 132. To do so, the contents of memory are searched for files matching the size of the file comprising the malicious computer executable instructions. When the size of the file is changed, such as by adding data to the file, such as the Record E 685, the file can no longer be located in memory through such mechanisms. As a result, attempts to initiate execution of any malicious computer executable instructions in the new structured document file 610 by first locating the file in memory based on a known size, can fail. Additionally, when the addition of data is combined with other modifications, such as the random rearranging of a structured document file's records, as will be described further below, the added data can become moved to a central part of the file, in which case, for the reasons described above, attempts to execute malicious computer executable instructions that are based on a fixed location within the file can likewise fail.

In another embodiment, rather than adding data to the end of a structured document file, or adding data in the form of a record, data can instead be inserted into a specific record. For example, as shown in the exemplary system 700 of FIG. 8, a record, such as the Record D 80 can have random data 785 inserted into it when it is written out as the new Record D 780 in the new structured document file 710. As before, the rest of the new structured document file 710, such as the records 720, 740 and 760, can be equivalent versions of the records 20, 40 and 60, respectively from the original structured document file 10.

While examining the original structured document file 10, various mechanisms can be utilized to determine that a record may comprise malicious computer executable instructions. For example, a traditional scan for signature elements of specific malware can be utilized. Alternatively, specific types of instructions or suspicious behavior can be searched for. Irrespective of the specific examination methodologies utilized, once a record or other segment of a structured document file 10, such as Record D 80 in the example of FIG. 8, is found to likely contain malicious computer executable instructions, such a record can have random data 785 inserted into it, thereby likely disrupting any malicious computer executable instructions, and rendering them incapable of performing their intended malicious task.

Figure 8:
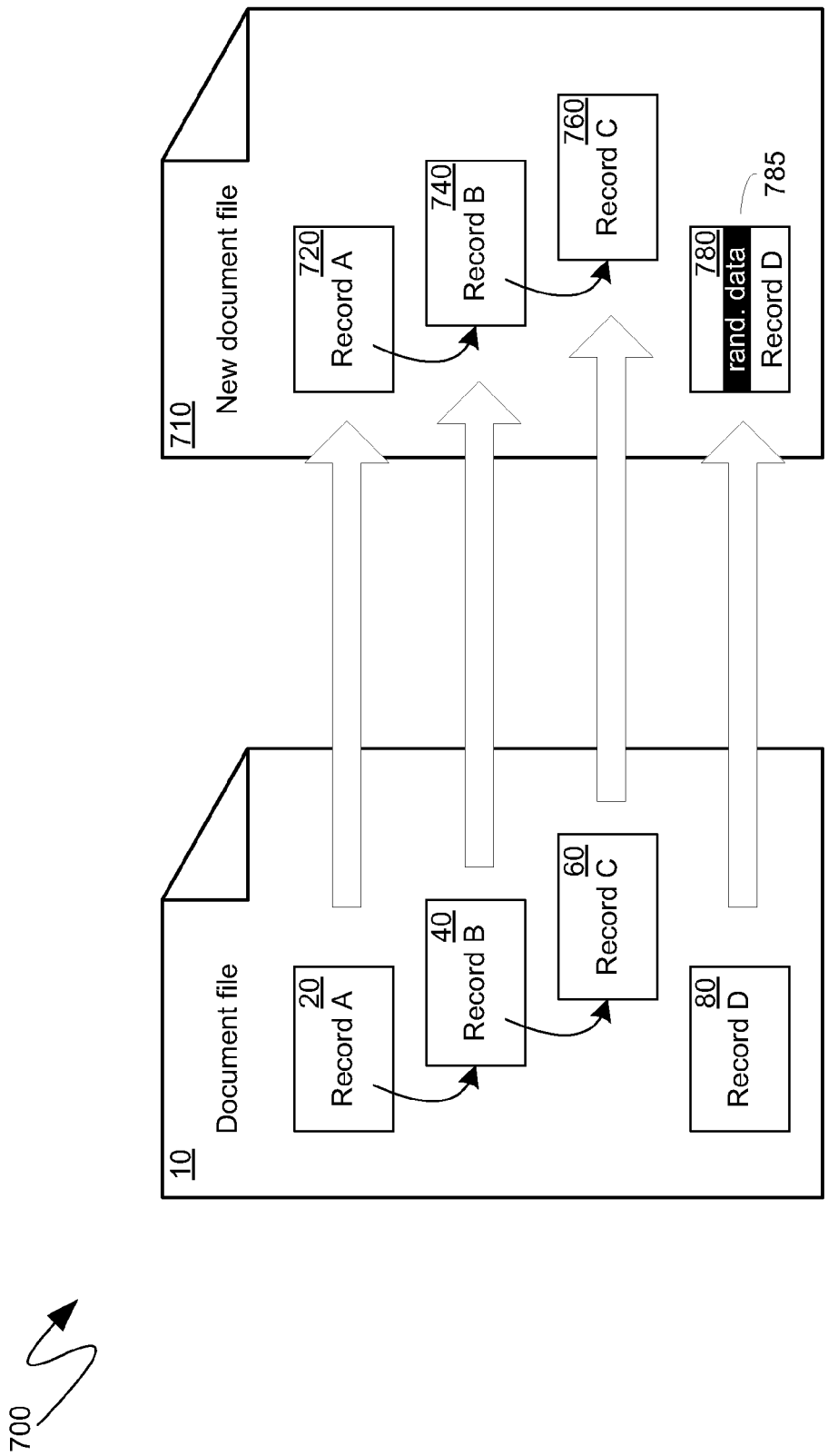
FIG. 8 is a block diagram of still another exemplary modification of a structured document file.

More specifically, as illustrated by system 700 of FIG. 8, each of the records 20, 40, 60 and 80 of the original structured document file 10 can be read and then written out to the new structured document file 710 as records 720, 740, 760 and 780, respectively. However, when writing out a record, such as the Record D 80, random data 785 can be inserted into such a record if a prior examination had identified that record as potentially possessing malicious computer executable instructions. Thus, as shown in the new structured document file 710, when the data of Record D 80 is written out to the new structured document file as Record D 780, the random data 785 can be inserted into it.

In another embodiment, rather than adding data to a structured document file, or removing it, the data of the structured document file can be rearranged. As indicated previously, such rearranging can be performed at the sector level, such as the file defragmentation illustrated with reference to FIG. 3, or the file fragmentation illustrated with reference to FIG. 4. The rearranging of data within a structured document file can also be performed at the record level. Thus, turning to FIG. 9, a system 800 illustrates an exemplary mechanism by which the records of a structured document file can be reordered, or otherwise rearranged. In particular, as before, the records 20, 40, 60 and 80 of the original structured document file 10 can be read and then written out to a new structured document file 810 as records 820, 840, 860 and 880, respectively. However, in writing out the records 820, 840, 860 and 880, the order in which the data of those records is stored within the file can be changed. Thus, for example, as illustrated in the exemplary system 800, Record C 860 can be written first into the new structured document file 810, followed by Record D 880, then Record A 820 and, finally, Record B 840. In one embodiment, no record can retain its same location within the structured document file, while in other embodiments, only some records may be rearranged.

As also indicated by the exemplary new structured document file 810, to the extent that any record maintained an association with another record, such associations can be maintained despite the reordering of the records. Thus, as shown, the association between Record C 60 and Record B 40 can be maintained between Record C 860 and Record B 840 in the new structured document file 810, despite the location of Record C 860 prior to Record B 840. Similarly, the association between Record B 40 and Record A 20 can be maintained between Record B 840 and Record A 820 in the new structured document file, despite the different location in the file of Record A 820 and Record B 840.

Figure 7:
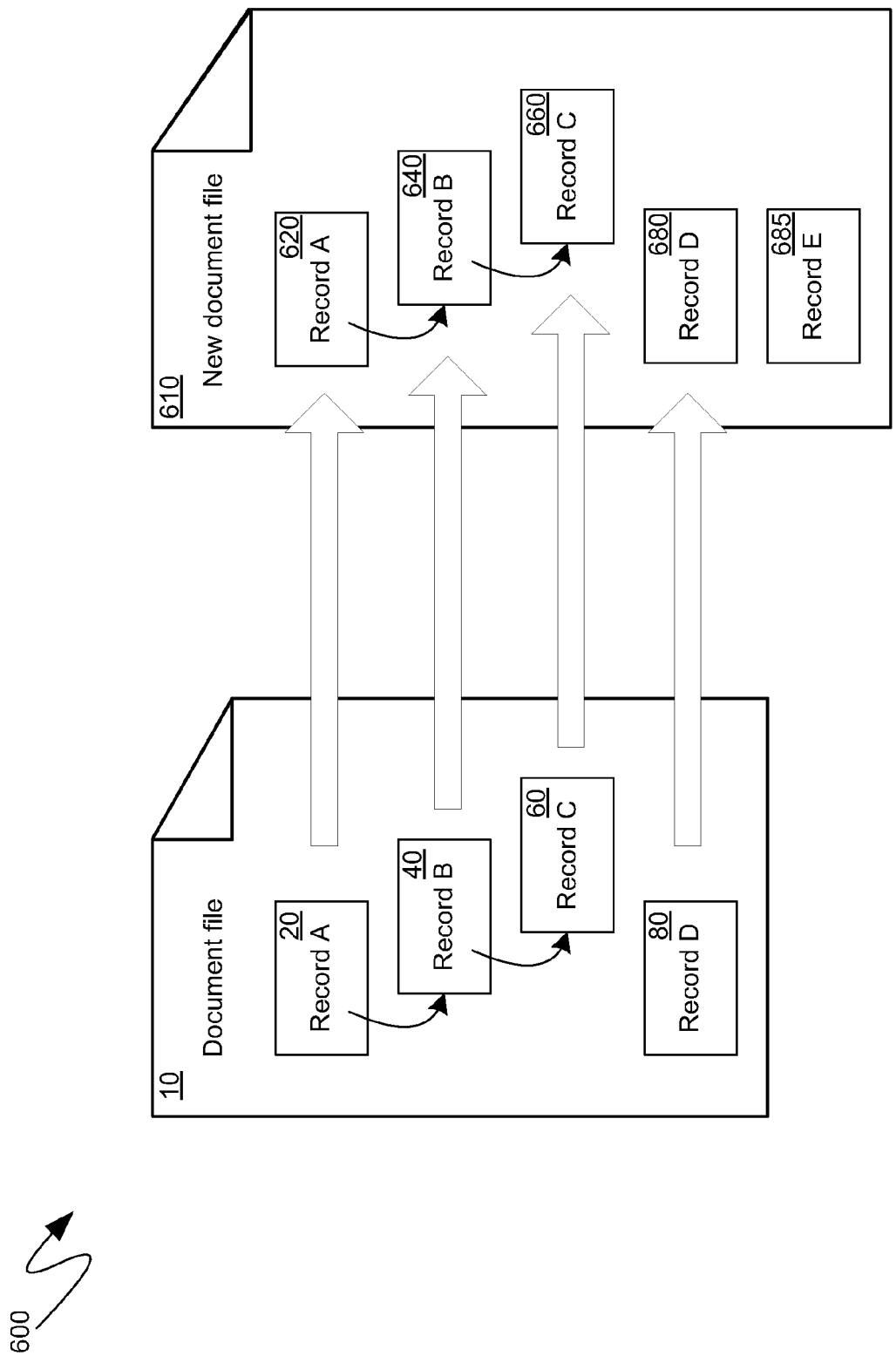
FIG. 7 is a block diagram of yet another exemplary modification of a structured document file.
Figure 9:
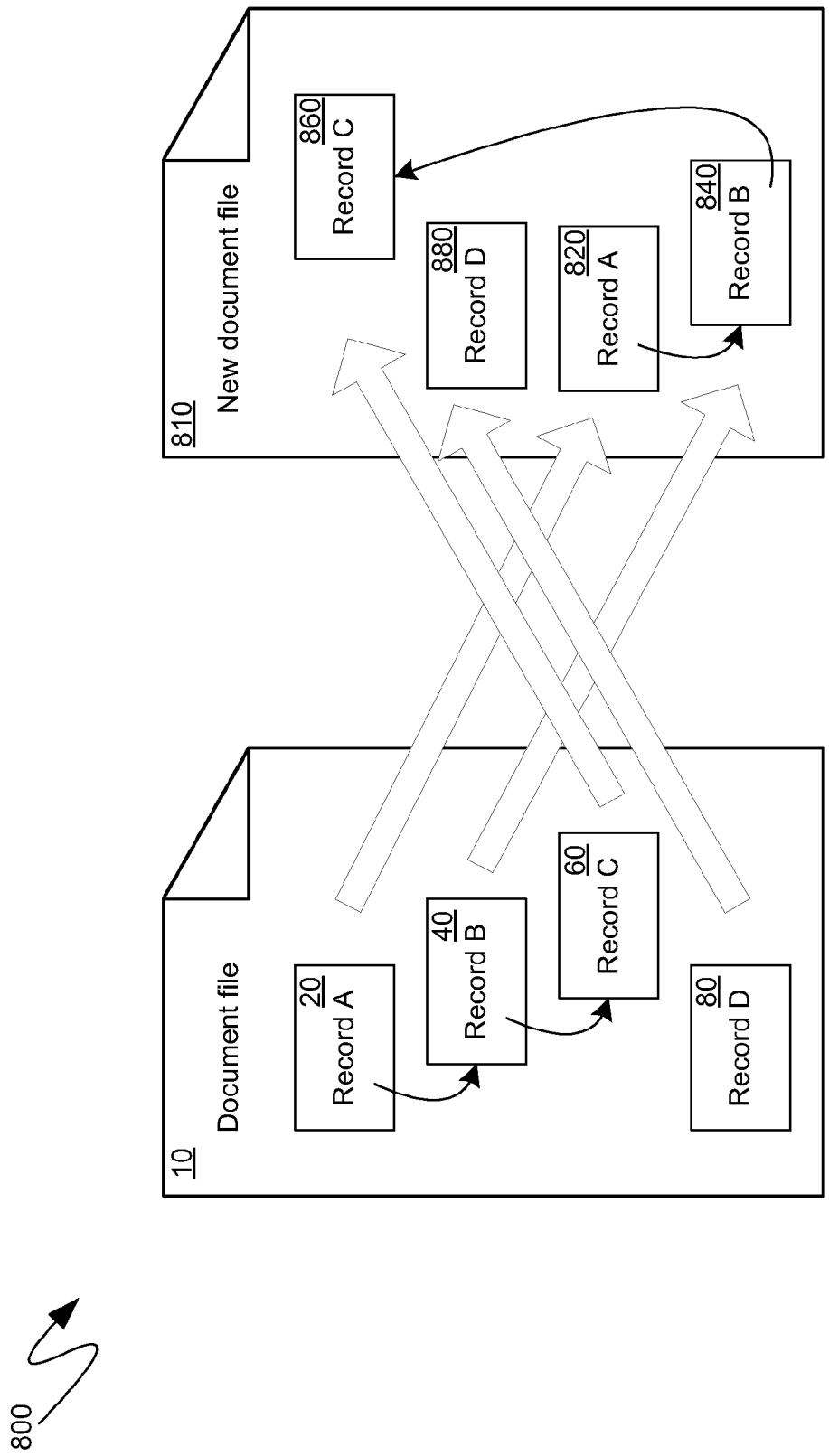
FIG. 9 is a block diagram of still another exemplary modification of a structured document file.

The rearranging of records within a structured document file, such as in the manner illustrated in FIG. 9, can be combined with one or more of the other modifications previously described. For example, a structured document file can be modified by first adding a record, such as the new Record E 685, as illustrated in FIG. 7, and then rearranging the records in the manner illustrated in FIG. 9. In such a case, the newly added Record E 685 would no longer be at the end of the resulting structured document file, and would, instead, be located elsewhere within the file. Other combinations of the above described modifications are similarly contemplated and can be useful to prevent the execution of malicious computer executable instructions that may have been embedded within the structured document file.

Figure 10:
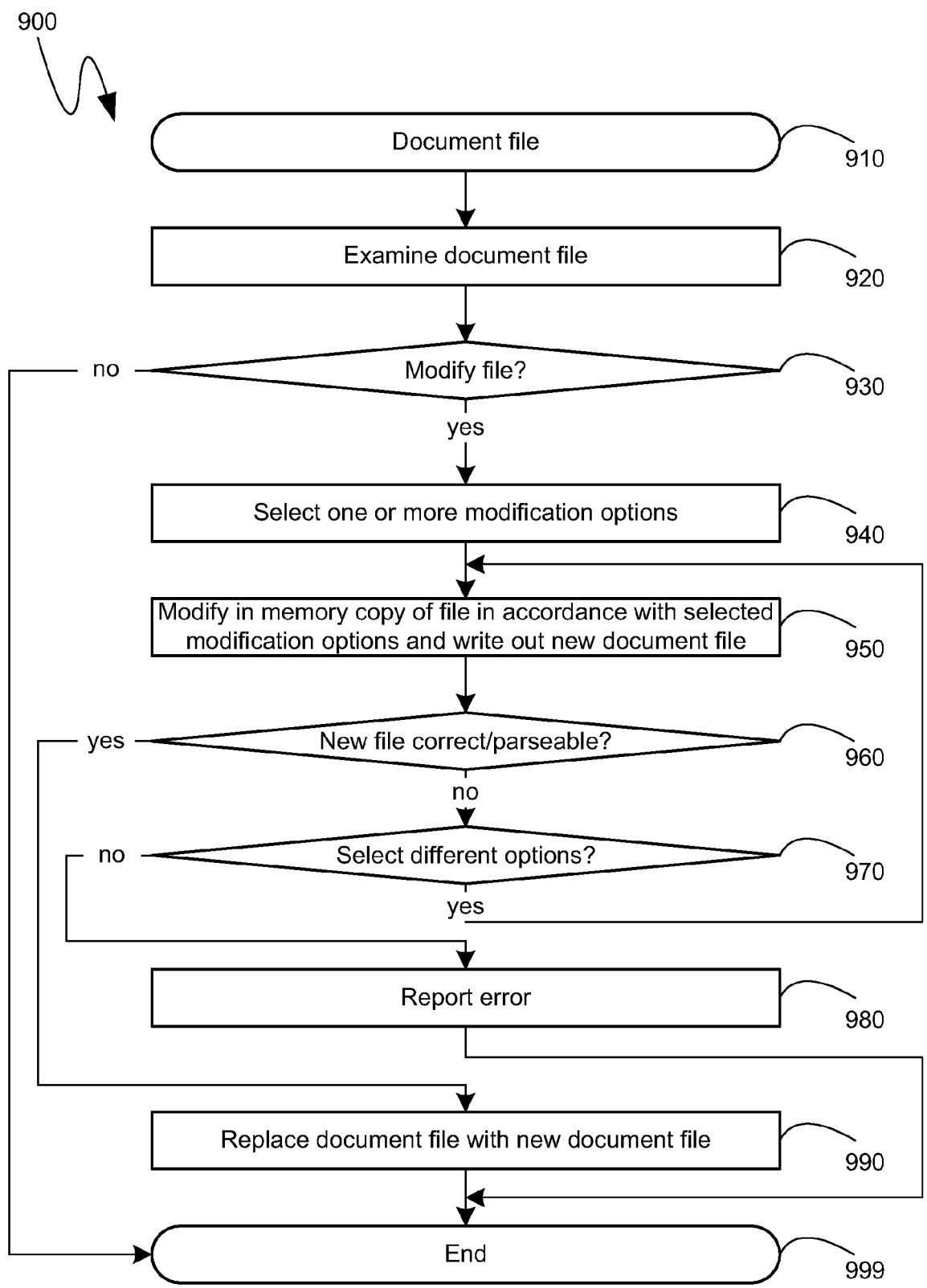
FIG. 10 is a flow diagram of an exemplary malware prevention mechanism for structured document files.

Turning to FIG. 10, a flow diagram 900 is shown, illustrating an exemplary series of steps by which the above described modifications can be utilized to prevent the execution of malicious computer executable instructions that may have been embedded in a structured document file. Specifically, as shown, at step 910 a structured document file can be received, or an already existing structured document file can be accessed or otherwise targeted for examination. For example, at step 910, the receipt of a structured document file via email, a network download, or a copy operation from an accessible storage device can trigger the examination of step 920. Similarly, already existing structured document files can, at step 910, be accessed or otherwise identified to be examined. At step 920, the identified one or more structured document files can be parsed or otherwise examined or analyzed to identify information that can indicate the presence of malicious computer executable instructions. The examination of step 920 can identify records within the structured document file, and their size and order, and can identify any of the other, previously indicated attributes of the structured document file, such as whether one or more records are disproportionally large. The examination of step 920 can also identify any potentially malicious computer executable instructions, such as through traditional malware scanning methodologies or other heuristic analysis.

At step 930, based on the results of the examination, a determination can be made as to whether to modify the structured document file that was examined at step 920. For example, if the structured document file that was examined at step 920 passed any traditional malware scan that was applied to it, and did not otherwise appear suspicious, such as by having a large amount of unaccounted for space, or by having disproportionally sized records that are not known to be good, then, at step 930, a determination can be made that there is no reason to modify the file. In such a case, processing can end at step 999, as shown.

However, if, at step 930, a determination is made to modify the structured document file that was examined at step 920, the modifications to be applied to the structured document file can be selected at step 940. In one embodiment, such a selection can comprise the addition of appropriate options to an invocation of a utility, component or set of computer-executable instructions that can modify structured document files in the manner described above. As indicated previously, the modifications selected can be informed by the results of the examination at step 920. Thus, for example, if a record was found to likely contain malicious computer executable instructions, the above described modification of inserting random data into such a record can be selected at step 940. Similarly, if the structured document file was found to contain unaccounted for space, a modification, such as that described above, whereby unaccounted for space is left behind, can be selected at step 940.

Once the modifications to be applied to the structured document file are selected at step 940, they can be applied at step 950, such as in the manner described in detail above with reference to FIGS. 3 through 9. After the selected modifications are applied at step 950, a determination can be made, at step 960, as to whether the resulting modified structured document file is semantically correct. Thus, for example, at step 960, an attempt can be made to parse the resulting modified structured document file to determine if it can be parsed in the manner expected. The parser used at step 960 can, for example, be a dedicated parser, or it can be any of the application programs that would traditionally open a file such as the modified structured document file.

If it is determined, at step 960, that the modified structured document file is semantically correct, then the new, modified structured document file can replace the original structured document file at step 990, thereby enabling a user to open the structured document file and access its contents, while still protecting the user's computing device from any potential infection from the structured document file. Subsequently, processing can end at step 999, as shown. If, however, the modifications applied at step 950 somehow impacted the proper parsing of the modified structured document file, as determined at step 960, then, optionally, at step 970, different modifications can be selected to be applied to the original structured document file. For example, one or more of the modifications selected at step 940 can be skipped at step 970 or, alternatively, a one or more different modifications can be selected at step 970. If such different modifications are selected, processing can return to step 950 and proceed as described above. If, however, no different options are selected at step 970, then, at step 980, an error can be reported. The error can optionally indicate that the structured document file was found to likely, or possibly, contain malicious computer executable instructions, but that attempts to modify the file to counter such malicious computer executable instructions failed. Processing can then end at step 999, as shown.

As can be seen from the above descriptions, mechanisms for modifying structured document files to prevent the execution of malicious computer executable instructions have been provided. In view of the many possible variations of the subject matter described herein, we claim as our invention all such embodiments as may come within the scope of the following claims and equivalents thereto.

We claim:

1. One or more computer-readable storage media not consisting of a signal, the one or more computer-readable storage media comprising computer-executable instructions for protecting against malware, the computer-executable instructions directed to steps comprising:

identifying a potential presence of malicious computer-executable instructions in a structured document file that represents a user-viewable document, and that comprises at least two structured document file records that each have a relative position with respect to other structured document file records within the structured document file, wherein each of the at least two structured document file records comprises at least two structured document file sectors that each have a relative position with respect to other structured document file sectors within a same structured document file record;

modifying, in response to the identifying, at least one of the relative position of at least one structured document file record or the relative position of at least one structured document file sector so as to disrupt execution of the identified potentially present malicious computer-executable instructions; and verifying a semantical correctness of the structured document file after the modifying.

2. The computer-readable storage media of claim 1, wherein the computer-executable instructions directed to modifying comprise computer-executable instructions directed to defragmenting the structured document file by rearranging one or more of the structured document file sectors, thereby modifying their relative position.

3. The computer-readable storage media of claim 1, wherein the computer-executable instructions directed to modifying comprise computer-executable instructions directed to fragmenting the structured document file by rearranging one or more of the structured document file sectors, thereby modifying their relative position.

4. The computer-readable storage media of claim 1, wherein the computer-executable instructions directed to modifying comprise computer-executable instructions directed to modifying the relative position of at least one structured document file record by removing at least one set of unaccounted for space from the structured document file.

5. The computer-readable storage media of claim 1, wherein the computer-executable instructions directed to identifying comprise computer-executable instructions directed to identifying at least one structured document file record that is both not known to be a good structured document file record and is disproportionally sized; and wherein the computer-executable instructions directed to modifying comprise computer-executable instructions directed to modifying the relative position of at least one structured document file record by removing the identified at least one structured document file record.

6. The computer-readable storage media of claim 1, wherein the computer-executable instructions directed to modifying comprise computer-executable instructions directed to modifying the relative position of at least one structured document file record by adding at least one of an additional structured document file record or an additional structured document file stream to the structured document file.

7. The computer-readable storage media of claim 1, wherein the computer-executable instructions directed to identifying comprise computer-executable instructions directed to identifying at least one structured document file record that likely comprises the malicious computer-executable instructions; and wherein the computer-executable instructions directed to modifying comprise computer-executable instructions directed to modifying the relative position of at least one structured document file record by inserting random data into the identified at least one structured document file record.

8. The computer-readable storage media of claim 1, wherein the computer-executable instructions directed to modifying comprise computer-executable instructions directed to modifying the relative position of at least one structured document file record by reordering the at least one structured document file record within the structured document file.

9. A computing device implemented method for protecting against malware, the method comprising the steps of:
identifying, with a processing unit of the computing device, a potential presence of malicious computer-executable instructions in a structured document file that represents a user-viewable document, and that comprises at least two structured document file records that each have a relative position with respect to other structured document file records within the structured document file, wherein each of the at least two structured document file records comprises at least two structured document file sectors that each have a relative position with respect to other structured document file sectors within a same structured document file record;
modifying, with the processing unit, in response to the identifying, at least one of the relative position of at least one structured document file record or the relative position of at least one structured document file sector so as to disrupt execution of the identified potentially present malicious computer-executable instructions; and
verifying a semantical correctness of the structured document file after the modifying.

10. The method of claim 9, wherein the modifying comprises defragmenting, with the processing unit, the structured document file by rearranging one or more of the structured document file sectors, thereby modifying their relative position.

11. The method of claim 9, wherein the modifying comprises fragmenting, with the processing unit, the structured document file by rearranging one or more of the structured document file sectors, thereby modifying their relative position.

12. The method of claim 9, wherein the modifying comprises modifying, with the processing unit, the relative position of at least one structured document file record by removing at least one set of unaccounted for space from the structured document file.

13. The method of claim 9, wherein the identifying comprises identifying, with the processing unit, at least one structured document file record that is both not known to be a good structured document file record and is disproportionally sized; and wherein the modifying comprises modifying, with the processing unit, the relative position of at least one structured document file record by removing the identified at least one structured document file record.

14. The method of claim 9, wherein the modifying comprises adding, with the processing unit, at least one of an additional structured document file record or an additional structured document file stream to the structured document file.

15. The method of claim 9, wherein the identifying comprises identifying, with the processing unit, at least one structured document file record that likely comprises the malicious computer-executable instructions; and wherein the modifying comprises modifying the relative position of at least one structured document file record by inserting, with the central processing unit, random data into the identified at least one structured document file record.

16. The method of claim 9, wherein the modifying comprises modifying the relative position of at least one structured document file record by reordering, with the processing unit, the at least one structured document file record within the structured document file.

17. One or more computer-readable storage media not consisting of a signal, the one or more computer-readable storage media comprising computer-readable data of a structured document file that represents a user-viewable document, and that comprises at least two structured document file records that each have a relative position with respect to other structured document file records within the structured document file, wherein each of the at least two structured document file records comprises at least two structured document file sectors that each have a relative position with respect to other structured document file sectors within a same structured document file record; wherein the structured document file was generated by modifying an original structured document file to change at least one of the relative position of at least one structured document file record or the relative position of at least one structured document file sector, so as to disrupt execution of malicious computer-executable instructions potentially present in the structured document file, by applying at least one of: a defragmentation of structured document file sectors, a fragmentation of structured document file sectors, a removal of unaccounted for space, a removal of a not known good and disproportionally sized structured document file record, an addition of a new structured document file record, an addition of a structured document file stream, an addition of random data to a structured document file record, and a rearranging of structured document file records.

18. The one or more computer-readable storage media of claim 17, wherein the structured document comprises a verified semantically correct structure.

19. The one or more computer-readable storage media of claim 17, wherein the structured document file comprises inoperable malicious computer-executable instructions.

* * * * *